Jan. 6, 1948.  A. L. JENNINGS ET AL  2,433,847
SEALED INSULATION BLOCK
Filed Aug. 9, 1941
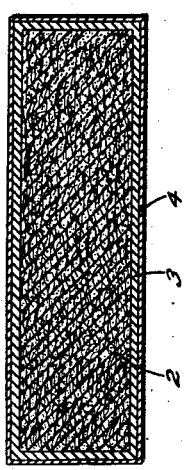
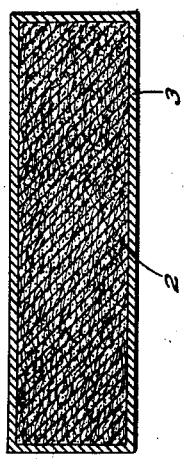
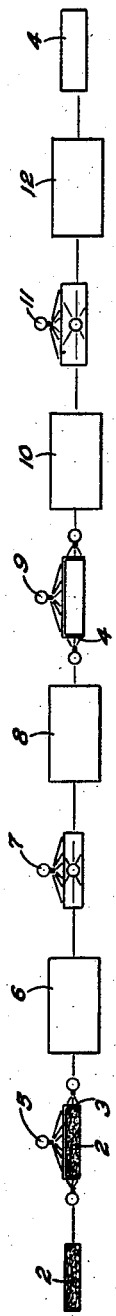

Patented Jan. 6, 1948

2,433,847

UNITED STATES PATENT OFFICE 2,433,847

SEALED INSULATION BLOCK

Arthur L. Jennings and Henry C. Brown, Jr., Lancaster, Pa., assignors to Armstrong Cork Company, Lancaster, Pa., a corporation of Pennsylvania Application August 9, 1941, Serial No. 406,098

7 Claims. (Cl. 117—81)

This invention relates to sealed insulation blocks and the method of making the same and, more particularly, to a glass wool insulation block having a porous and irregular exterior surface which is rendered vaporproof by the application of a suitable coating or membrane which seals the openings and extends over the surface irregularities without material penetration into the interior of the block and to a method of making such block.

In providing insulation for refrigerators, ice cream cabinets and similar equipment, it is important that some means be provided for preventing the condensation of moisture within the insulating material itself when the structure is in use. The tendency for moisture to condense within the wall structure of such devices is inherent in the construction for the interior of the structure is maintained at a temperature considerably lower than the temperature of the surrounding atmosphere so that there is a large temperature gradient between the interior and exterior walls of the structure. In this gradient and consequently within the insulation there occurs a temperature called the dew point, at which point the moisture in the air tends to condense. Such condensation increases the heat conductivity of the wall structure and detrimentally affects the insulation.

Heretofore, it has been proposed to eliminate this difficulty by dipping the insulation material in molten asphalt for example. This practice is satisfactory for some insulating materials, such as corkboard, but we have found it is of little or no advantage when the insulation material is composed of matted and entangled fibers as, for example, blocks or mats of glass wool or mineral wool fibers, fiberboard or the like. Blocks or mats composed of such fibers have highly porous and irregular exterior surfaces and consequently such process effects a thorough impregnation of the block or mat which, of course, seriously affects its value for insulation. Furthermore, the surface of the block or mat so treated is not vaporproof unless an expensive and uneconomical amount of asphalt be used and condensation may occur within the interior thereof with resulting detrimental effects upon the insulation. Consequently, this procedure is not effective and is of little or no value in the sealing of mineral wool blocks, fiberboard or the like to render them vaporproof.

The chief object of our invention is to provide an insulation block or mat composed of matted and entangled fibers which is substantially vaporproof. An object of our invention is to provide an insulation block or mat composed of matted and entangled fibers and having a highly porous exterior surface, which carries a sealing coating disposed thereover and effective for sealing the openings in the exterior surface without substantial penetration into the interior of the block or mat. A further object is to provide a method of making a sealed, vaporproof block or mat composed of matted and entangled fibers.

This invention relates to an insulation block composed of matted and entangled fibers presenting a porous exterior surface, and a sealing coating adhering to said block closing the openings in the surface without material penetration thereof into the interior of the block. Preferably, the block or mat is composed of inorganic fibers such as glass wool fibers or mineral wool fibers while the coating comprises the dried residue of a clay type asphalt emulsion.

The invention further relates to a method of making a sealed, vaporproof insulation block or mat composed of matted and entangled fibers in which a sealing coating is sprayed over the surface to close the openings without substantial penetration of the coating into the interior of the block or mat.

The attached drawing illustrates a preferred embodiment of our invention, in which Figure 1 is a sectional view illustrating the sealed block of our invention;

Figure 2 is a sectional view similar to Figure 1, showing a second coating applied to the sealed block; and Figure 3 is a diagrammatic view illustrating the method of making the sealed block.

Referring to the drawing, there is shown in Figure 1 a block, mat or board 2 composed of entangled and matted fibers, preferably, inorganic fibers such as glass wool fibers or mineral wool fibers. The block 2 may be formed in the usual manner customary in the industry and possesses a highly porous and irregular exterior surface, the pores and interstices therein extending into the porous interior. A sealing coating 3 is disposed over the exterior surface of the block 2 and such coating need be of sufficient thickness to close the openings and to extend over the irregularities in the surface. It is essential in our invention that such coating close the openings without material or substantial penetration into the interstices in the block; in other words, there must be no substantial penetration by the coating composition into the porous interior of the block which would increase the heat conductivity of the block and detrimentally affect its insulating value. It is essential that such coating 3 be of sufficient thickness to securely seal the openings in the surface of the block, thus obviating condensation of moisture within the interior of the block which detrimentally affects the insulation and also increases its heat conductivity. A coating approximately 1/32" in thickness is satisfactory for this purpose.

We have found a coating formed of a so-called clay type asphalt emulsion, which is asphalt suspended in water by the use of a clay empulsifying agent, is satisfactory. Such coating is applied by spraying or brushing it over the surface of the block and it may be composed of the following ingredients in the proportions stated by weight: Asphalt 932 parts, bentonite clay 30 parts, water 627 parts, and potassium dichromate 3.6 parts. In this composition, asphalt, of course, is the sealing material and similar bituminous materials may be substituted therefor. Bentonite clay is the emulsifying agent and it is our belief that it serves in the coating to prevent penetration of asphalt into the interstices of the block; similar argillaceous materials which also permit the preparation of colloidal solutions, for example, "Eyerite" a material composed largely of magnesium silicate, may, of course, be substituted therefor. Potassium dichromate is used as a stabilizing agent for the emulsion. Suitable methods for preparing clay type asphalt emulsions are well-known in the art and do not require further description. Generally, a single sprayed application of coating composition is satisfactory to seal the openings but if desired more than one application of such composition may be made to assure sealing of the openings and leveling of the somewhat irregular surface.

We have found that this coating 3 may be somewhat soft, sticky, or adhesive under conditions of temperature encountered in storage or shipment. Accordingly, we place a "dusting" coating 4 thereover, as shown in Figure 2, to ensure that the blocks do not adhere to one another in storage or shipment. Such coating may be composed of the following ingredients, all proportions being given by weight: Casein 15 parts, whiting or talc 525 parts, borax 5 parts, sodium metasilicate 0.5 part, formalin 2.5 parts, and water 506 parts. The ingredients are stirred together in any suitable mixer and the coating composition may be applied to the block by spraying, brushing or dipping. It will be understood similar coating compositions may be used in place of that described above since its purpose is to prevent blocks carrying sealing coatings from adhering to one another; a second asphalt coating of higher melting point than the sealing coating may be used in place of casein-talc or casein-whiting coatings.

In Figure 3, we have illustrated diagrammatically a method of applying such coatings 3 and 4 to the block 2. In this case, the block 2 is passed through a spraying device 5 which sprays sealing coating 3 on its upper surface and on two sides of the block. The block 2 is then passed into a drying chamber 6 and such coating dried. The asphalt apparently tends to coalesce about the clay particles during the drying operation and this appears to aid in preventing penetration of asphalt into the interstices of the block. The block 2 is then rotated and a second spraying device 7 applies the sealing coating to the bottom of the block and the remaining sides after which it is passed into a chamber 8 in which such applied coating is dried. Similar spray devices 9 and 11 apply coating 4 in a similar manner and chambers 10 and 12 serve to dry the applied coating 4. The process may be carried on continuously or intermittently as desired. We have found a clay type asphalt emulsion prepared as above described forms a satisfactory sealing coating for insulation materials formed of matted and entangled fibers such as glass wool fibers since such coating does not penetrate to any substantial extent within the interstices of the insulation material. We believe, although we do not desire to be restricted thereto, that the clay used in the preparation of the asphalt emulsion blocks or closes the interstices in the surface of the insulation material and thus prevents the penetration of asphalt within the porous interior. Our belief is confirmed to some extent by the fact that other types of asphalt emulsions definitely penetrate the interstices and do not form a coating on the insulation material which extends over and conceals its surface irregularities.

Our invention provides a vaporproof insulation material which has a greater service life than similar materials which are not vaporproof. Condensation cannot occur to any substantial extent within the insulation material and it thus retains its insulating value throughout its life. The coating applied to seal the insulating material and to render it vaporproof does not penetrate to any substantial extent within the interstices thereof and does not detract to any substantial degree from its insulating value. The cost involved in vaporproofing the board is minute in comparison with the advantages derived therefrom. Our process is simple, economical and expeditiously carried out by unskilled workmen. It is preferable that the insulating material be sealed at its place of manufacture but our process is so economical and easily conducted that the insulating material may be sealed at its place of assembly or erection without difficulty.

While we have described and illustrated a preferred embodiment of our invention, it will be understood our invention is not so limited since it may be otherwise embodied within the scope of the following claims.

We claim:

1. An insulation block composed of matted and entangled inorganic fibers presenting a porous and irregular exterior surface, said block having a normal heat insulating value, and a sealing coating adhering to said block closing the openings and extending over the irregularities in the surface without material penetration thereof into the interior of the block so as not to alter substantially its normal heat insulating valve, said coating comprising the dried residue of an aqueous dispersion including a bituminous material and an argillaceous material, the bituminous material being present in said coating in an amount substantially greater than the amount of argillaceous material.

2. An insulation block according to claim 1 in which the block is composed of glass wool fibers.

3. An insulation block according to claim 1 in which the block is composed of mineral wool fibers.

4. An insulation block composed of matted and entangled glass wool fibers presenting a porous and irregular exterior surface and having a normal heat insulating value and a sealing coating disposed over the surface of the block of sufficient thickness to close the openings and to extend over the irregularities in the surface without substantial penetration thereof into the interior of the block so as not to alter substantially the normal heat insulating valve, said coating consisting of the dried residue of a clay type asphalt emulsion and containing asphalt and a minute quantity of emulsifying agent.

5. An insulation block composed of matted and entangled glass wool fibers presenting a porous and irregular exterior surface, a sealing coating disposed over the surface of the block closing the openings and extending over the irregularities in the surface without substantially penetration thereof into the interior of the block, said coating comprising the dried residue of a clay type asphalt emulsion, and a dusting coating disposed over the sealing coating.

6. An insulation block according to claim 5 in which the dusting coating comprises the dried residue of a composition including casein, a filler and a vehicle.

7. An insulation block according to claim 5 in which the sealing coating comprises the dried residue of a composition including asphalt, bentonite clay and water wh'ch contains asphalt in major proportion and only a minute quantity of bentonite clay, and in which the second coating comprises the dried residue of a composition including casein, a preservative therefor, whiting, and water.

ARTHUR L. JENNINGS.
HENRY C. BROWN, Jr.

REFERENCES CITED

The following references are of record in the file of this patent:

UNITED STATES PATENTS

| Number | Name | Date |
| --- | --- | --- |
| 1,029,652 | White | June 18, 1912 |
| 1,330,443 | Glynn | Feb. 10, 1920 |
| 1,191,099 | Thickens | July 11, 1916 |
| 1,849,369 | Frost | Mar. 15, 1932 |
| 2,208,236 | Wiener | July 16, 1940 |
| 1,566,943 | Wilson et al. | Dec. 22, 1925 |
| 2,154,476 | Simpson et al. | Apr. 18, 1939 |
| 1,749,159 | Respess | Mar. 4, 1930 |
| 1,865,634 | Kirschbraun | July 5, 1932 |
| 2,056,598 | Coughlin | Oct. 13, 1936 |
| 1,774,204 | Levin | Aug. 26, 1930 |
| 2,244,097 | Burkart | June 3, 1941 |

Certificate of Correction

Patent No. 2,433,847. January 6, 1948.

ARTHUR L. JENNINGS ET AL.

It is hereby certified that errors appear in the printed specification of the above numbered patent requiring correction as follows: Column 3, line 12, for "empulsifying" read *emulsifying*; column 4, line 57, claim 1, and column 5, line 3, claim 4, for the word "valve" read *value*; line 12, claim 5, for "substantially" read *substantial*; and that the said Letters Patent should be read with these corrections therein that the same may conform to the record of the case in the Patent Office.

Signed and sealed this 23rd day of March, A. D. 1948.

[SEAL]

THOMAS F. MURPHY,
*Assistant Commissioner of Patents.*